(12) United States Patent
Streuter et al.

(10) Patent No.: US 12,120,512 B2
(45) Date of Patent: Oct. 15, 2024

(54) ONLINE VALIDATION SERVICE SECURES ACCESS TO DEVICES CONNECTED WIRELESSLY TO A SECURE SECONDARY INTELLIGENT ROUTER MODULE, WHICH IS CONNECTED VIA A WIRELESS CONNECTION TO A PRIMARY WIRED/WIRELESS ROUTER/MODEM

(71) Applicants: Gary William Streuter, Laguna Niguel, CA (US); William Pat Price, Lake Havasu City, AZ (US); Andy Gutman, Foothill Ranch, CA (US)

(72) Inventors: Gary William Streuter, Laguna Niguel, CA (US); William Pat Price, Lake Havasu City, AZ (US); Andy Gutman, Foothill Ranch, CA (US)

( * ) Notice: Subject to any disclaimer, the term of this patent is extended or adjusted under 35 U.S.C. 154(b) by 394 days.

(21) Appl. No.: 17/653,794

(22) Filed: Mar. 7, 2022

(65) Prior Publication Data
US 2022/0295280 A1 Sep. 15, 2022

Related U.S. Application Data

(60) Provisional application No. 63/158,014, filed on Mar. 8, 2021.

(51) Int. Cl.
*H04W 76/15* (2018.01)
*H04W 12/08* (2021.01)

(52) U.S. Cl.
CPC .......... *H04W 12/08* (2013.01); *H04W 76/15* (2018.02)

(58) Field of Classification Search
CPC .............................. H04W 12/08; H04W 76/15
USPC ......................................................... 455/411
See application file for complete search history.

(56) References Cited

U.S. PATENT DOCUMENTS

| | | | |
|---|---|---|---|
| 11,706,219 B1* | 7/2023 | Davey | H04L 63/083 |
| 2007/0022469 A1* | 1/2007 | Cooper | H04L 9/3247 |
| | | | 726/3 |
| 2010/0299451 A1* | 11/2010 | Yigang | H04L 65/80 |
| | | | 709/241 |
| 2021/0243188 A1* | 8/2021 | Grocutt | H04L 41/046 |
| 2023/0388345 A1* | 11/2023 | Ilincic | H04W 12/06 |

* cited by examiner

*Primary Examiner* — Hirdepal Singh
(74) *Attorney, Agent, or Firm* — Scott C Harris, Esq (57) ABSTRACT

An external Secure Intelligent Secondary Router is connected to a Primary Wired/Wireless Router/Modem via wire cable, and whereby said external Secure Intelligent Secondary Router communicably coupled to said Primary Wired/Wireless Router/Modem creates one or more secure secondary Wi-Fi networks that can only be accessed by a computing device that has been registered by the rightful account owner and whose identity has been validated by an online validation service.

3 Claims, 4 Drawing Sheets

Access Flow, User Computer Device Mobile

Fig. 1 - Access Flow, User Computer Device Mobile

Fig. 2 - Access Flow, User Computer Device Local

ONLINE VALIDATION SERVICE SECURES ACCESS TO DEVICES CONNECTED WIRELESSLY TO A SECURE SECONDARY INTELLIGENT ROUTER MODULE, WHICH IS CONNECTED VIA A WIRELESS CONNECTION TO A PRIMARY WIRED/WIRELESS ROUTER/MODEM

This application claims priority from provisional U.S. provisional application No. 63/158,014, filed Mar. 8, 2021, the entire contents of which are herewith incorporated by reference.

CROSS REFERENCE TO RELATED APPLICATIONS

The present invention is related to application Ser. No. 14/717,352 now granted U.S. Pat. No. 9,691,067 which is considered copied herein in its entirety.

The present invention is related to provisional application 63/158,014 filed Mar. 8, 2021 which is considered copied herein in its entirety.

FIELD OF INVENTION

The field of invention relates to providing access security for wireless Internet of Things (IoT) devices, where an external intelligent secondary router module, generating one or more secondary secured Wi-Fi networks, is wirelessly connected to a primary Internet router/modem, and said external intelligent secondary router module is used to block unknown devices from connecting to said secondary secured Wi-Fi network(s) unless said computing device seeking access is validated and authorized by the specified online validation service.

BACKGROUND

In the cyber world we live in, the issue of digital security has risen to new heights of awareness and concern. This can range from the security of your financial and personal data, to even issues of physical security. The concept of right to enter and authorized access are under siege from relatively new innovations such as the Internet, that has made information available to anyone with the simple press of a button. Want to know something—just Google™ it!

As wonderful as the connectivity we enjoy today is, it has also opened many avenues for hackers and criminals and other bad actors to exploit our personal information, as well as our private data and even access to secure physical locations controlled with smart locks considered Internet of Things (IoT). With the invention described in this disclosure, the inventor's goal is to provide the rightful owners of data, accounts, applications and property with a digital hardware key that validates the identity of a computing device that initiates an access or authorization request in order to protect against sophisticated hackers, criminals, and bad actors.

The methods and system described in this disclosure can be used to provide authentication, validation and authorization of access requests from a user's computing devices to Internet of Things (IoT) devices by creating a unique digital identity key drawn from hardware and software identifiers present in the said user's computing device seeking access. Said unique digital key may be used to validate the identity of said user's computing device that is initiating the access request and determine if said user's computing device has previously been authorized for use in the current transaction by the rightful owner of the account and/or the IoT device.

The inventors consider this invention to be an important development in providing multi-factor access security for typical Internet router/modem devices in use in hundreds of millions of homes and businesses around the world.

The Internet of Things (IoT) is upon us and growing rapidly. Its influence is expected to grow even more rapidly in the years to come. Said Internet of Things will extend to our homes, businesses, hobbies, education and just about every other facet of our lives. Secured spaces and things that are connected to a network/Internet will be commonplace and given the sophistication of hackers/criminals/bad actors, it is realistic to believe that as this market matures, so too will attempts to gain unauthorized access to these systems.

A projected area of growth is the use of IoT devices within our homes, businesses, and vehicles. Securing access to these IoT devices is an important step in creating user confidence regarding the deployment of these types of devices. The range of IoT devices being deployed is wide and varied. Common among them are Internet connected security cameras, video doorbells, appliance monitors, door locks, safes, thermostats, kitchen appliances, streaming televisions and lighting. A key to this development is the ability of these network connected devices to securely communicate with computing devices via the Internet.

As this method of use becomes mainstream and expands in usage, it will be imperative to safeguard against unauthorized access by hackers/criminals/bad actors in order to make sure that the level of security we believe we have achieved, is in fact really secure and not subject to exploitation. The inventors are confident that the ability of our technology to validate the identity of a computing device being used to gain access to Internet connected devices will greatly increase real world security.

Problem Statement

The identity and authorization of computing devices seeking to connect to IoT devices, is easily compromised and subject to unauthorized access. Access security is often based on nothing more than a username and password, or inadequate two-factor authentication. Concern with security for IoT devices will hinder the proliferation of these types of devices and reduce the advantages that can be gained by adopting such technology. What is needed is systems and methods that can validate the identity of the user and the device seeking to connect to and gain access to IoT devices.

SUMMARY OF THE INVENTION

The intent of the present invention is to provide an external secure intelligent secondary router, generating one or more secure secondary Wi-Fi networks and connected to a primary router/modem device through a wireless connection. This invention is intended to prevent malicious actors using unknown computing devices from gaining access to IoT type devices connected to said secure intelligent secondary router. Said secure intelligent secondary router intercepts connection requests from computing devices seeking to gain access to IoT devices connected to said secondary Wi-Fi network controlled by said secure intelligent secondary router. Once a connection request is detected by the secure intelligent secondary router it sends, through the primary router to which it is connected via a wireless connection, a request for the computing device seeking access to undergo a validation process. If said computing device does not have an installed first software program, known as a client agent, or if said computing device seeking access has not previously been registered and validated, then the validation process notifies the secure intelligent secondary router, and the connection request is denied. If said computing device has been previously registered and authorization for access for that specific computing device has been confirmed by an online validation service, the secure intelligent secondary router will allow the connection to said secondary secured Wi-Fi network to take place. The invention makes use of a validation process contained in the related application defined in application Ser. No. 14/717,352, now granted U.S. Pat. No. 9,691,067 and is copied herein in its entirety.

A first software program, known as a client agent, is resident and operating on a computing device that is known and approved by the rightful owner of an account. Said client agent, during the validation process, collects a set of various hardware and software identifiers from said computing device upon which it is installed, and protects the set of identifiers by encrypting them, and forwards said encrypted set of identifiers to said online validation service. Said validation service constructs a unique identification and validation key from these hardware and software identifiers and said validation key acts as a digital access key for the authorization process required for gaining access. In essence, the present invention validates the identity of a computing device being used to initiate the access or authorization request and ensures that the request is coming from a computing device previously registered in the online validation service and fully authorized for said use by the rightful account owner. Even if a hacker/criminal/bad actor has an account owner's complete personal and financial data, including their username, password or a forced biometric marker, the access request will not be approved unless it is being initiated by a computing device which has been properly registered in the online validation service and revalidated with each access request. This invention provides a huge step forward in achieving security by greatly enhancing and expanding the definition and use of multi-factor authentication techniques to reduce the scale of fraudulent transactions.

The methods defined by this invention provide a computing device, known and approved by the rightful account owner, to be registered with the online validation service referenced in this disclosure and described in the previously noted granted patent. Said registered computing device may be used to initiate the request for access to said secondary Wi-Fi network, generated by said secure intelligent secondary router. By validating the identity of said computing device seeking access against those values previously registered and maintained in the online validation service, the invention ensures that the access request is being made from a computing device authorized by the rightful account owner. The inclusion of the validated identity of the physical computing device seeking access into the authorization equation creates the requirement for inclusion of something physical into the access/authorization request and thus, there is no longer any opportunity to gain unauthorized access simply in a digital fashion. Thus, the inclusion of a physical factor moves hackers out of their digital comfort zone. Said computing device becomes the rightful account owner's physical digital identification key, and much like a typical mechanical key, it must be part of the process for successful authorization and access.

Operating in a Zero-Trust mode, when a request for access to said secure intelligent secondary router is initiated, the specified distinctive hardware and software identifiers are redrawn by said first software program present on said computing device for each access/authorization request and matched to the values previously registered in said online validation service. In the event of a match of these identifiers, access to said secondary Wi-Fi network is granted. In the event said identifiers are not matched, access to said secondary Wi-Fi network is denied.

It is also important to note several unique attributes of this invention. The first software program known as the client agent, may itself have a unique identification indicator which may also be included within the specified distinctive identifiers submitted by said client agent to the validation service for inclusion in the unique digital access key. Said client agent redraws said specified designated identifiers in real time for each validation transaction submitted.

Said online validation service is composed of anonymous data that cannot be associated on its own with the identity of the computing device that spawned the specified distinctive identifiers, nor the protected account that requested said validation. By way of example, imagine you are walking down the street and you find a totally unmarked key in the gutter. Yes, you have the key but you have no idea of where that key could be used. The anonymous nature of the data stored within the online validation service is an important feature in the success of this technology.

Dictionary

Secure Intelligent Secondary Router: An intelligent module that connects via a wireled connection to a primary Internet router/modem that passes through Internet access to said secure intelligent secondary router module.

Secondary Wi-Fi Network: One or more secondary Wi-Fi networks are generated by said secure intelligent secondary router module connected wirelessly to a primary Internet router/modem and whereby said secondary Wi-Fi network (s) are separate and distinct from Wi-Fi networks generated by said primary Internet router/modem. Secure Intelligent Secondary Router Primary Internet Router/Modem: A primary means of accessing the Internet and distributing Internet access and whereby the modem & router functionality may be combined in a single module or said router and modem may be housed in separate physical modules.

Anonymous Data: Data that cannot be associated on its own with the identity of the computing device that spawned the data, nor the protected account that requested said data.

Applications/Operating Systems/Secure Data: This refers to software programs and secured data that are resident on a local computing device which also is the device executing the first software program client agent.

Client Agent: A first software program executing on a computing device. The client agent initiates a validation of said computing device by collecting a set of specified distinctive identifiers from said computing device that is initiating an account access transaction and is part of an authorization/access process. These extracted values are submitted to an online validation service server for matching with the values previously stored in said online validation service during the computing device registration process.

Collected Distinctive Identifiers: The process whereby said first software program defined in this disclosure extracts with each access request, the specified distinctive identifiers from said computing device that is initiating an access transaction as part of an authorization/access process. These extracted values are submitted to an online validation service for matching with the values previously stored in said online validation service during the registration process to validate the identity of a computing device seeking account access.

Internet of Things (IoT): This refers to physical devices that are network connected mechanical/electrical devices. Examples of this may be, but are not limited to, security cameras, video doorbells, outlet sensors, access doors/gates and appliances.

Password: A secret code typically only known by the rightful account owner and a transaction certifying authority, and which may be included in the set of specified distinctive identifiers.

Registration: The process whereby a first software program installed on a computing device completes an initial process of collecting specified distinctive identifiers from said computing device and transmits those values to a registration software program residing on said online validation service, which then inserts these values into an online validation database of computing devices authorized for account access.

Secure Element: Used to denote devices, accounts, data or places that are secured and may be addressed by this invention.

Specified Distinctive Identifiers: A group of defined serial numbers and/or other digital characteristics, which may be considered unique, collected by a first software program from hardware and software modules resident on a computing device and for purposes of this disclosure, may also include a unique string of data inputted by the account owner, such as a password or biometric marker, and/or a unique identification number assigned to said first software program.

Transaction: For purposes of this disclosure, the term transaction may refer to general transaction requests such as validating a computing device, or requests for access.

Unique Identification Number: A unique recognition number that may be assigned to said first software program and which may be included in the collected specified distinctive identifiers.

Unique String of Data: A collection of data such as passwords or biometric markers that are inputted into a computing device by an account owner and may be included in the specified distinctive identifiers supplied to the online validation service for matching.

Online validation service: A remote database of registered access keys based on specified distinctive identifiers drawn from computing devices and maintained in an online validation service server.

Validation Request: A request to a computing device to reissue specified distinctive identifiers and whereby said reissued values are matched against the registration values that are in an online validation service in order to validate the identity of a local computing device that initiated the transaction that spawned the validation request.

EMBODIMENTS

In a first exemplary embodiment a system is disclosed consisting of a user computing device hosting a Companion Application and a client agent, a companion server hosting a companion cloud app, the companion server residing on a network communicably coupled to the internet and in communications with said Primary Wired/Wireless Router/Modem. Said Primary Wired/Wireless Router/Modem and said secure intelligent secondary router communicably coupled to said Primary Wired/Wireless Router/Modem via a wireless connection, both residing inside a business or resident. Said validation server resides on a network and is communicably coupled to the internet and to said Primary Wired/Wireless Router/Modem. Said user computing device communicates wirelessly with said companion server and said Primary Wired/Wireless Router/Modem via a cellular network. Said Primary Wired/Wireless Router/Modem communicates with said companion server and said validation server via the internet. IoT devices (IoT Device 1/Security Camera, and IoT Device 2/Network Storage or any other IoT device capable of communicating with a user's mobile computing device) communicate with said Secure Intelligent Secondary Router via a wireless connection. In operation, said User Computing Device communicates with said Companion Server to request connection with said IoT Devices, and said Companion Server that communicates with said Primary Wired/Wireless Router/Modem over the internet. Said Validation Server communicates with said Primary Wired/Wireless Router/Modem over the internet. Connection Requests are received by said Companion Server/Companion Cloud App and sent to said Primary Wired/Wireless Router/Modem which passes said request onto said Secure Intelligent Secondary Router which sends a request via said Primary Wired/Wireless Router/Modem to request said User Computing Device to validate itself with said Validation Server/Validation Database. The request for Validation is sent by said Primary Wired/Wireless Router/Modem to said Validation Database which sends said validation request to said User Computing Device. When said User Computing Device receives said validation request from said Validation Database it launches said Client Agent. Said Client Agent gathers and encrypts a set of unique identifiers from hardware and software modules and sends said encrypted set of unique identifiers to said Validation Database. Said Validation Database attempts to match said encrypted set of unique identifiers to at least one set of previously stored encrypted unique identifiers and if a match is made, a return status is set to "Validated Access Granted", and if a match was not made, a return status is set to "Not Validated, Access Denied". Said Validation Database sends said return status to said Primary Wired/Wireless Router/Modem which sends it onto said companion cloud app and to said secure wireless router. Said secure intelligent secondary router determines the state of said return status and if said return status is equal to "Validated Access Granted", said secure intelligent wireless router sends said return status onto said IoT devices notify them that they are connected to said companion cloud app and if said secure intelligent wireless router determines the state of said return status and if said return status is equal to "Not Validated, Access Denied", said secure intelligent wireless router does not send said return status to said IoT devices.

In a related embodiment, said Secure Intelligent Secondary Router may be connected via an wired cable connection to said Primary Wired/Wireless Router/Modem instead of being connected via a wireless connection.

In yet another related embodiment, the intelligent software contained in Secure Intelligent Secondary Router is embedded in the Primary Wired/Wireless Router/Modem.

DETAILED DESCRIPTION OF THE DRAWING

Figure 1:
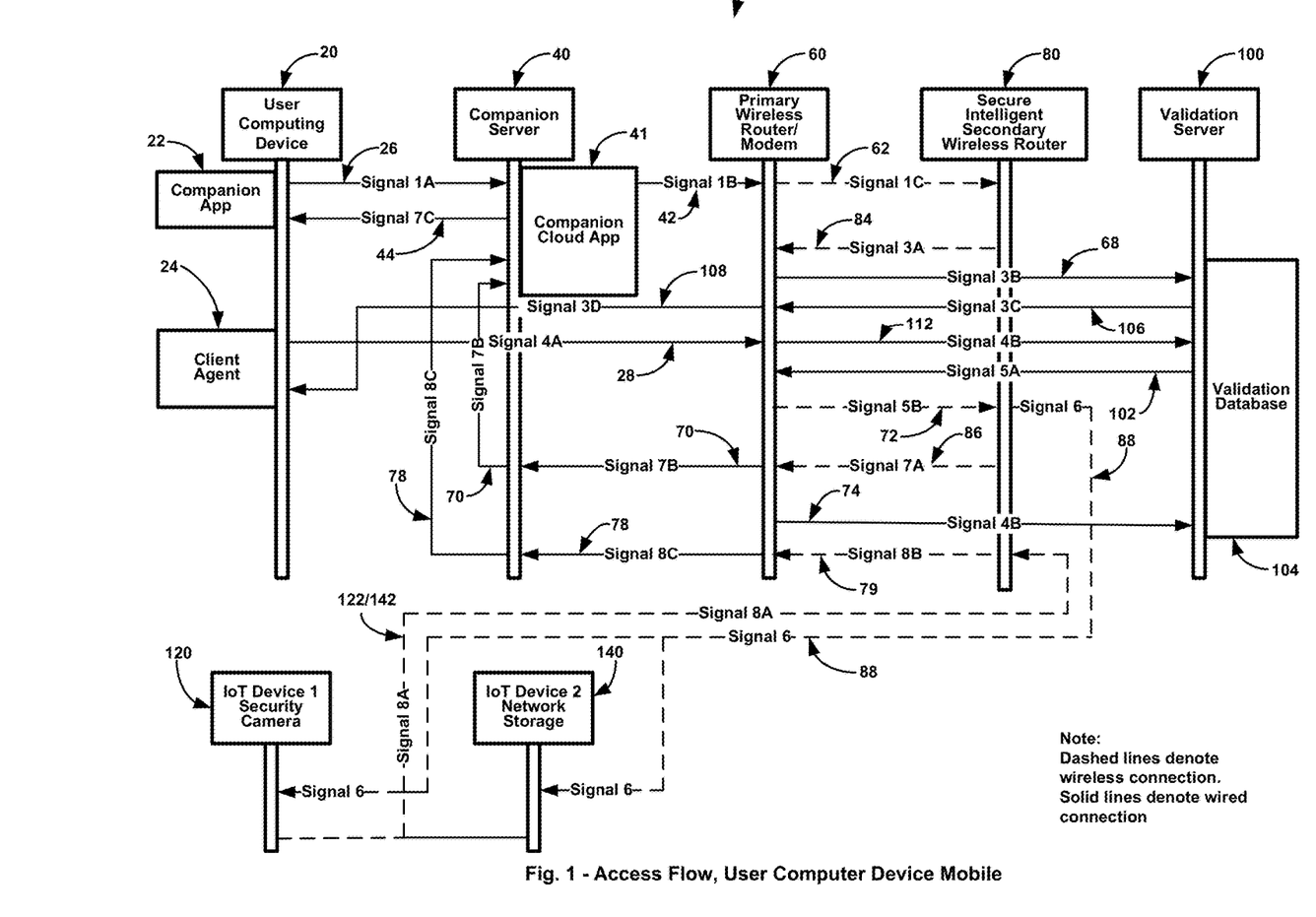
FIG. 1 is a depiction of a logic flow chart showing the interaction between the various nodes described in the embodiments and detailed description of the present invention.
Figure 2:
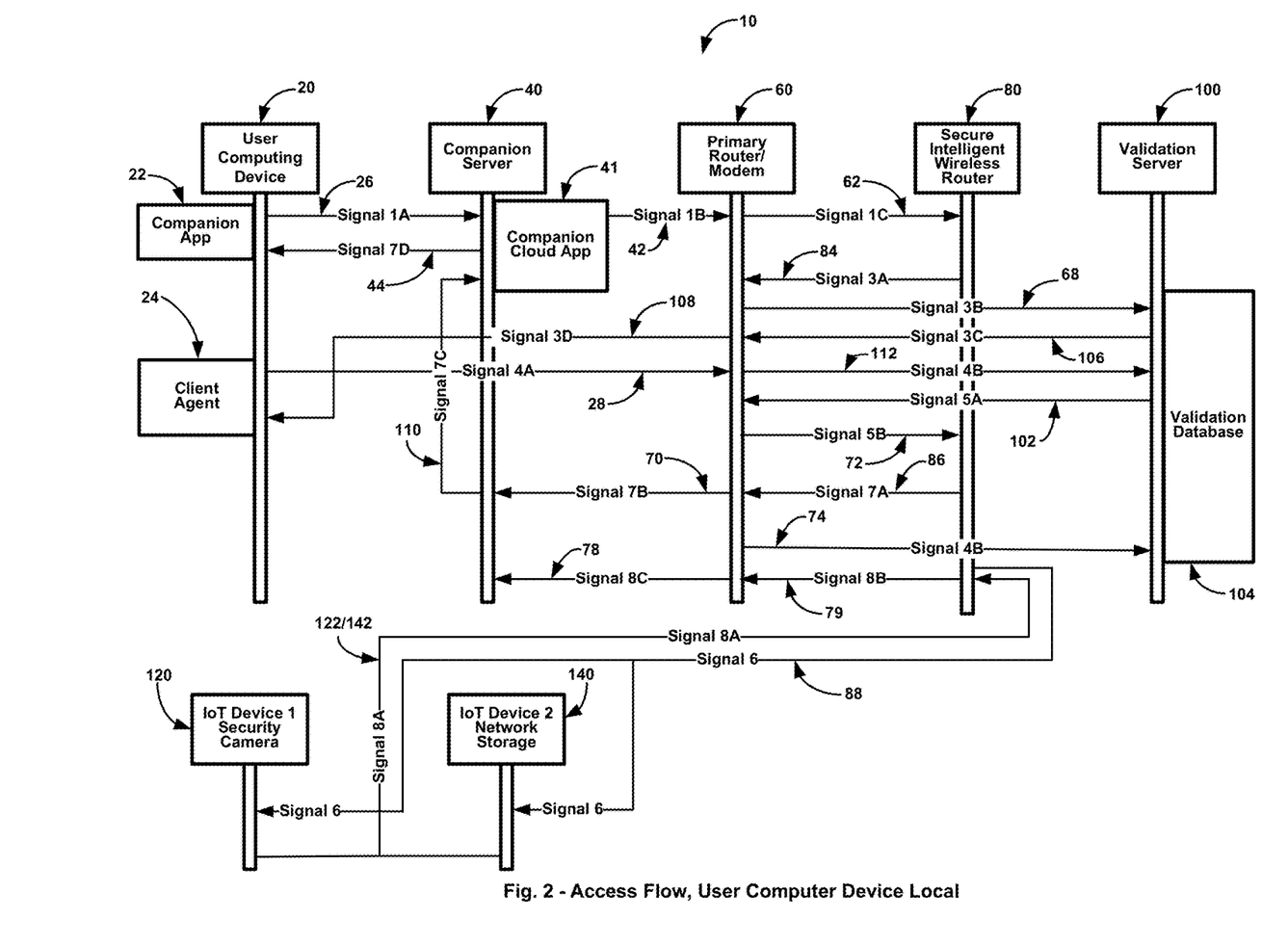
FIG. 2 shows a local access flow.
Figure 2B:
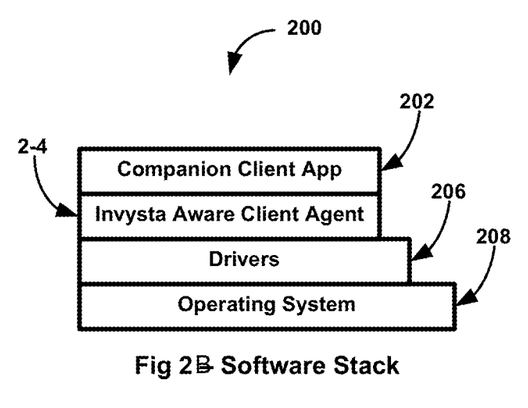
FIG. 2B shows the software stack.
Figure 3:
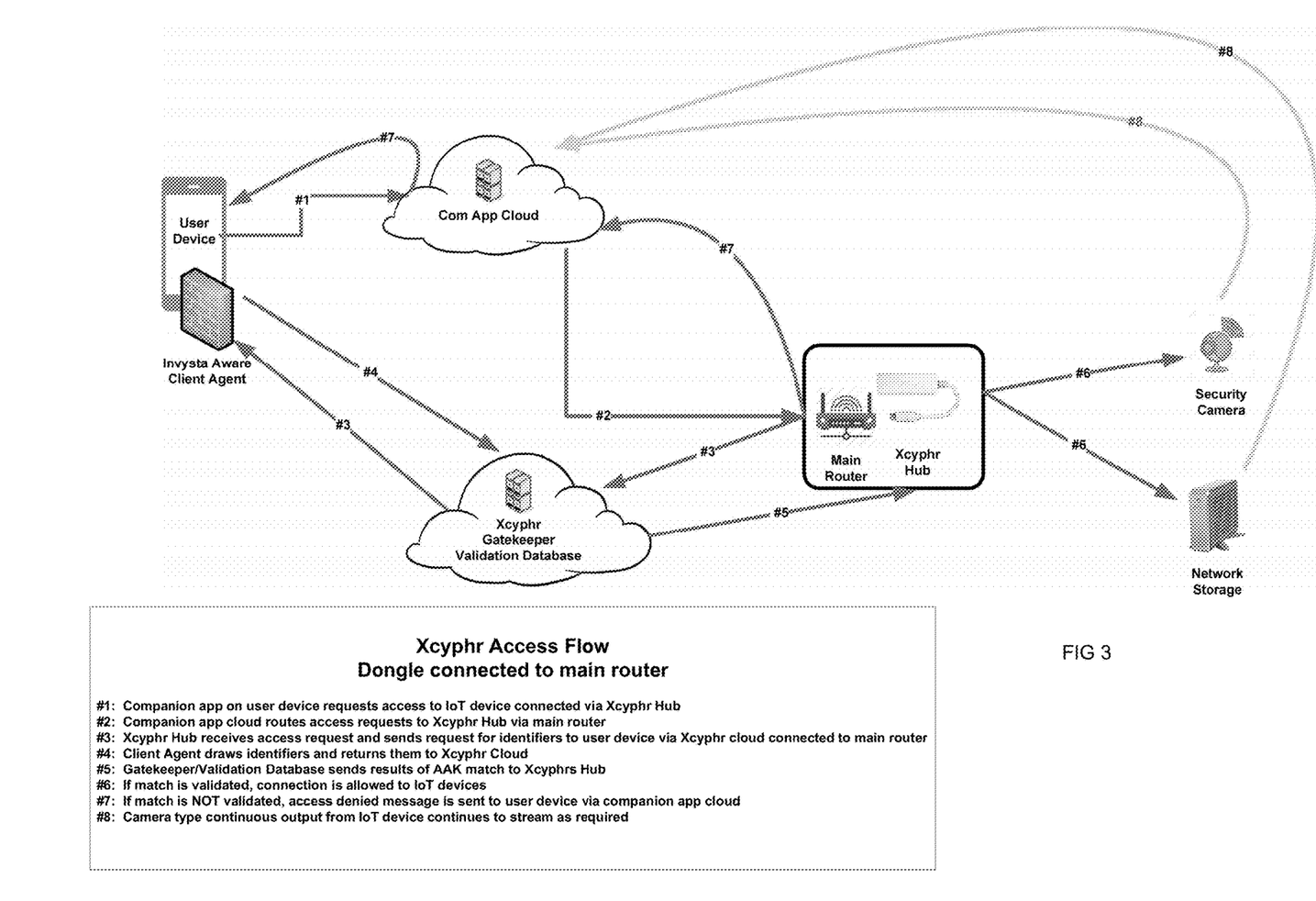
FIG. 3 shows the access flow.

Now referencing FIG. 1 where 10 depicts a process chart access flow diagram. This depiction contains User Computing Device 20, Companion Server 40, Primary Wired/Wireless Router/Modem 60, Secure Intelligent Secondary Router 80, Validation Server 100, and two IoT devices, depicted as IoT Device 1/Security Camera 120 and IoT Device 2/Network Storage device 140. User Computing Device 20 contains Companion Application 22 and a first software program Client Agent 24.

Companion Application 22 is used by the user to connect to one or more IoT devices, such as Security Camera 120 and/or Network Storage Device 140. To connect to either of these IoT devices, Companion Application 22 will first connect to Companion Cloud App 41 through Companion Server 40. Companion Cloud App 41 will perform the actual connection between Companion Application 22 and the selected IoT device(s).

In this depiction, the process flow begins at User Computing Device 20 Companion Application 22. Companion Application 22 knows the URL for Companion Cloud App 41. Depending on the physical location of Computing Device 20, User Computing Device 20 may use a cellular or Internet network connection or a Wifi connection to communicate with Companion Server 40 and Companion Cloud App 41. Companion Application 22 executing on User Computing Device 20 sends Connection Request Signal 1A, 26, to Companion Cloud App 41 via Companion Server 40. Companion Cloud App 41 determines the URL where the IoT device to be connected to resides and forwards Connection Request Signal 1B, 42 to Primary Wired/Wireless Router/Modem 60.

Primary Wired/Wireless Router/Modem 60 receives Connection Request Signal 1B, 42, and forwards Connection Request Signal 1B, 42, as Connection Request Signal 1C, 62, to Secure Intelligent Secondary Router 80 via a wireless connection from said Primary Wired/Wireless Router/Modem 60.

Secure Intelligent Secondary Wireless Router 80 is an intelligent hub providing one or more secondary Wifi networks connected to one or more IoT devices. User Computing Device 20 is seeking access to IoT device 1/Security Camera 120 and/or IoT Device 2/Network Storage 140. Secure Intelligent Secondary Router 80 now wirelessly sends Validation Request Signal 3A, 84, to Primary Wired/Wireless Router/Modem 60. Primary Wired/Wireless Router/Modem 60 now forwards Validation Request Signal 3B, 68, to Validation Server 100/Validation Database 104. Validation Server 100/Validation database 104 forwards Validation Request Signal 3C, 106, to Primary Wired/Wireless Router/Modem 60 which forwards Validation Request 3C, 106 as Validation Request 3D, 108 to said Computing Device 20 which causes first Client Agent 24 to execute on Computing Device 20.

After launch, first Client Agent 24 collects a set of unique identifiers from hardware and software modules resident on User Computing Device 20 and encrypts said hardware and software unique identifiers as encrypted set of unique identifiers. This encrypted set of unique identifiers is sent to Validation Service 100/Validation Database 104 as Validation Request Signal 4A, 28 to said Primary Wired/Wireless Router/Modem 60. Said Primary Wired/Wireless Router/Modem 60 forwards said Validation Request Signal 4B, 112 to Validation Server 100/Validation Database 104. Validation Database 104 receives Validation Request Signal 4B, 112, containing said encrypted set of unique identifiers from said User Computing Device 20.

Online Validation Database 104 validates the encrypted set of unique identifiers received in Validation Request Signal 4B, 112 by matching them against previously registered encrypted set of unique identifiers in said Validation Database 104. If a match is confirmed, Validation Database 104 sets Return Status equal to "Validated, Access Granted". If a match is not made, Validation Database 104 sets Return Status equal to "Not Validated, Access Denied".

Validation Database 104 sends Return Status Signal 5A, 102, to Primary Wired/Wireless Router/Modem 60. Primary Wired/Wireless Router/Modem 60 sends Return Status Signal 5B, 72, to Secure Intelligent Secondary Wireless Router 80.

Secure Intelligent Secondary Router 80 wirelessly receives Return Status, Signal 5B, 72, and if Return Status equals "Validated Access Granted", Secure Intelligent Secondary Router 80 sends Connect Signal 6, 88, to either IoT Device 1/Security Camera 120 or IoT Device 2/Network Storage 140 depending on which IoT device was selected. The selected IoT Device sends Connected Signal 8A, 122/142, to Secure Intelligent Secondary Router 80, which sends Connected Signal 8B, 79 to Primary Wired/Wireless Router/Modem 60 via a wireless connection. Primary Wired/Wireless Router/Modem receives Connected Signal 8B, 79 via a wireless connection, and forwards Connected Signal 8C, 78, to Companion Cloud App 41 as Signal 8C 78. Companion Cloud App 41 sends Signal 7C 44 to Companion Application 22 on User Computing Device 20.

If Secure Intelligent Secondary Router 80 receives Return Status Signal 5B, 72, and if Return Status equals "Not Validated, Access Denied", Secure Intelligent Secondary Wireless Router 80 sends "Access Denied Connection" Signal 7A, 86, to Primary Wired/Wireless Router/Modem 60. Primary Wired/Wireless Router/Modem 60 sends "Access Denied Connection" Signal 7B, 70 to Companion Cloud App 41. Companion Cloud App 41 then sends "Access Denied" Signal 7C, 44, to Computing Device 20, and Companion Application 22 visually notifies the user that a connection to the selected IoT device has failed.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory-based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification. Operations as described herein can be carried out on or over a website. The website can be operated on a server computer, or operated locally, e.g., by being downloaded to the client computer, or operated via a server farm. The web site can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A system for securely protecting local Internet of Things (IoT) wireless devices by not allowing access to any IoT device without verifying the identity of a user's computing device prior to granting the access comprising:
   a first primary wired/wireless router/modem communicably coupled to a first secure intelligent secondary router via a wireless communication connection, said first secure intelligent secondary router having knowledge of local wireless devices wirelessly communicably coupled to said first secure intelligent secondary router, said system comprising:
   a first user and,
   a first wired or wireless user computing device hosting a first companion application and, a first client agent and,
   a first companion server residing on an external network, said first companion server hosting a first companion cloud application, and said first primary wired/wireless router/modem residing in a home or business and, said first secure intelligent secondary router and, a first validation server and, a first validation database hosted on said first validation server and, at least a first wireless IoT device;

a) said first companion application executing on said first wired or wireless user computing device sends a first connect request as signal 1A to said first companion cloud application executing on said first companion server, and said first companion cloud application receives said connect request as signal 1A and passes said connect request as signal 1B to said first Primary wired/wireless router/modem as signal 1B and said first Primary wired/wireless router/modem receives said connect request as signal 1B and passes said connect request as signal 1C to said first secure intelligent secondary router as said connect request signal 1C;

b) said first secure intelligent secondary router receives said connect request signal 1C and determines that said connect request signal 1C is a connect request requiring said first user's computing device to be validated by said first validation database residing on said first validation server, and said first secure intelligent secondary router is aware of said first validation database, and said first secure intelligent secondary router sends said connect request signal 1C to said primary router/modem as connect request signal 3A;

c) said primary wired/wireless router modem receives said connect request signal 3A and passes it onto said first validation database residing on said first validation server, and said first validation database receives said connect request signal 3B and sends a validation request as signal 3C to said first Primary Wired/Wireless Router/Modem, and said first Primary wired/wireless router/modem receives said validation request signal 3C and passes said validation request signal 3D to said first user computing device as validation signal 3D;

d) said first user computing device receives said validation request signal 3D and launches said first client agent, and said first client agent assembles a first set of unique identifiers from hardware and software modules resident on said first user computing device, and said client agent secures said first set of unique identifiers by encrypting said first set of unique identifiers as said first set of encrypted unique identifiers, and said first client agent sends said first set of encrypted unique identifiers as signal 4A to said first Primary wired/wireless router/modem, and said first primary wired/wireless router/modem sends said first set of encrypted unique identifiers as signal 4B to said first validation database;

e) said first validation database receives said first set of encrypted unique identifiers and attempts to match said first set of encrypted unique identifiers against at least one set of previous sets of encrypted unique identifiers in said first validation database, and if a match is made, said first Validation Database sets Return Status, Signal 5A, equal to "Validated, Access Granted", and if a match is not made, said first Validation Database sets Return Status, Signal 5A, equal to "Not Validated, Access Denied", and after said match is attempted and said Return Status Signal 5A is set, said validation database sends said Return Status Signal 5A to said first Primary Wired/Wireless Router/Modem;

f) Said first primary wired/wireless router/modem receives said Return Status Signal 5A and said first Primary wired/wireless router/modem wirelessly sends said Return Status Signal 5A as Return Status Signal 5B, to said first secure intelligent secondary router, and said first secure intelligent secondary router sends said Return Status Signal 5B, to said first Primary wired/wireless router/modem as Return Status Signal 7A, and first Primary wired/wireless router/modem passes said Return Status Signal 7A to said first companion cloud application as Return Status Signal 7B, and if said return status signal 5B, is "Validated, Access Granted", said first secure intelligent secondary router sends return status signal 5B as signal 6 to said at least first IoT device to begin its data operation by sending said data to said first secure intelligent wireless router as signal 8A;

g) said first companion cloud application receives Return Status Signal 7B, and passes said Return Status Signal 7B to said first companion application executing on said first user computing device as Return Status Signal 7C after which said first companion application will display a visual notification to the user that the connection to either IT device 1 or to IoT device 2 was successful;

h) If Return Status Signal 5B received by said first secure intelligent secondary router is "Validated, Access Granted", secure intelligent secondary router sends signal 6A, to the selected IoT device 1 or IoT device 2 that a connection has been made and the device is in service.

2. The system of claim 1 where said first Secure Intelligent secondary Router is connected via a wired cable connection to said first Primary wired/wireless router/modem instead of being connected to said first Primary Wired/Wireless Router/Modem via a wireless connection.

3. The system of claim 1 where a software control program contained in and controlling said first secure intelligent secondary router is embedded in said first primary wired/wireless router/modem providing the same functionality for said first primary wired/wireless router/modem as is described for said first secure intelligent secondary router.

\* \* \* \* \*